(12) United States Patent
Donovan (10) Patent No.: US 7,091,979 B1
(45) Date of Patent: Aug. 15, 2006

(54) PIXEL LOAD INSTRUCTION FOR A PROGRAMMABLE GRAPHICS PROCESSOR

(75) Inventor: Walter E. Donovan, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 99 days.

(21) Appl. No.: 10/652,531

(22) Filed: Aug. 29, 2003

(51) Int. Cl.
*G06T 1/60* (2006.01)
*G06F 13/00* (2006.01)

(52) U.S. Cl. ..................... 345/530; 345/536; 345/537

(58) Field of Classification Search ................ 345/530, 345/536, 537, 559
See application file for complete search history.

(56) References Cited

U.S. PATENT DOCUMENTS

| | | | |
|---|---|---|---|
| 6,452,601 B1* | 9/2002 | Marino et al. | 345/538 |
| 6,559,852 B1* | 5/2003 | Ashburn et al. | 345/533 |
| 6,795,078 B1* | 9/2004 | Lavelle et al. | 345/535 |
| 2002/0050999 A1* | 5/2002 | San et al. | 345/530 |
| 2002/0118202 A1* | 8/2002 | Baldwin | 345/530 |

* cited by examiner

*Primary Examiner*—Kee M. Tung
*Assistant Examiner*—Joni Hsu
(74) *Attorney, Agent, or Firm*—Patterson & Sheridan, L.L.P.

(57) ABSTRACT

A pixel load instruction for a programmable graphics processor. The pixel load instruction may be used during processing of graphics data to load graphics data from a writable output buffer into a local storage element. Using the pixel load instruction may ensure that the graphics data loaded is current, i.e., any pending writes to the location storing the graphics data are completed prior to loading the graphics data. Furthermore, the pixel load instruction may be enabled and disabled for one or more writable output buffers by setting or clearing bits in a pixel load enable register.

9 Claims, 11 Drawing Sheets

PIXEL LOAD INSTRUCTION FOR A PROGRAMMABLE GRAPHICS PROCESSOR

FIELD OF THE INVENTION

One or more aspects of the invention generally relate to processing graphics data in a programmable graphics processor, and more particularly to reading graphics data from a writable output buffer.

BACKGROUND

Current graphics data processing is exemplified by systems and methods developed to perform a specific operation on several graphics data elements, e.g., linear interpolation, tessellation, texture mapping, depth testing. Traditionally graphics processing systems were implemented as fixed function computation units and more recently the computation units are programmable to perform a limited set of operations. Computation units are connected in a "shading pipeline" to perform shading operations.

The shading pipeline includes a write interface for writing graphics data to graphics memory, such as writing color data to a color buffer for display as an image. The shading pipeline also includes a texture read interface for reading texture data from a texture map stored in graphics memory. Conventionally a writable output buffer, such as a color buffer for display may not be read from by the texture read interface. Therefore, prior to accessing the color buffer as a texture map, such as during reflection mapping, the color buffer may be copied to a read-only texture buffer. Copying the color buffer to a texture buffer requires reading the color buffer and writing the texture buffer, using memory bandwidth which is often a valuable resource in a graphics subsystem.

For the foregoing reasons, it is desirable to directly read from a color buffer using the texture read interface without copying the color buffer to a texture buffer.

SUMMARY

Various embodiments of the invention a pixel load program instruction. The pixel load program instruction includes a source position corresponding to a location within a writable buffer and a destination address corresponding to a local storage element.

Various embodiments of a method of the invention include a method of executing a pixel load program instruction in a graphics processor. A graphics primitive is received. Determination that a pixel load enable is enabled. A sync bundle is output. Confirmation that the sync bundle processing is complete is received. The graphics primitive is rasterized to produce fragments.

Yet further embodiments of a method of the invention include executing a pixel load shader program instruction in a graphics processor. A graphics fragment associated with a position is received. A sync bundle is output. Confirmation that the sync bundle processing is complete is received. The graphics fragment is output.

Various embodiments of the invention include a programmable graphics processor for execution of program instructions. The programmable graphics processor includes a rasterizer configured to process primitives to produce fragments and a pixel load unit coupled to the rasterizer, the pixel load unit configured to generate a sync bundle for each primitive and determine if the sync bundle processing is complete.

Various embodiments of the invention include a pixel load unit for detecting pixel collisions during fragment shading. The pixel load unit includes a first coverage data buffer configured to store first pixel coverage data, a second coverage data buffer configured to store second pixel coverage data, and a pixel collision detector coupled to the first coverage data buffer and coupled to the second coverage data buffer, the pixel collision detector configured to detect pixel collisions during fragment shading.

Further embodiments of the invention include a computing system. The computing system includes a host processor, a host memory, a system interface, and a programmable graphics processor. The host memory stores programs for the host processor. The system interface is configured to interface with the host processor. The programmable graphics processor includes a pixel load unit, a read interface, a fragment processing unit, and a write interface. The pixel load unit is configured to generate and output sync bundles using position data associated with fragments. The read interface is configured to read data from one or more buffers. The fragment processing unit is configured to receive the fragments and the data read from the one or more output buffers and generate processed fragments. The write interface is configured to write the processed fragments to the one or more output buffers.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DISCLOSURE OF THE INVENTION

The current invention involves a new programmable graphics processor instruction, a pixel load shader program instruction and systems and methods for processing graphics data using the pixel load shader program instruction. Furthermore, the pixel load shader program instruction may be enabled and disabled for one or more writable output buffers by setting or clearing bits in a pixel load enable register using a pixel load shader program enable instruction.

Figure 1:
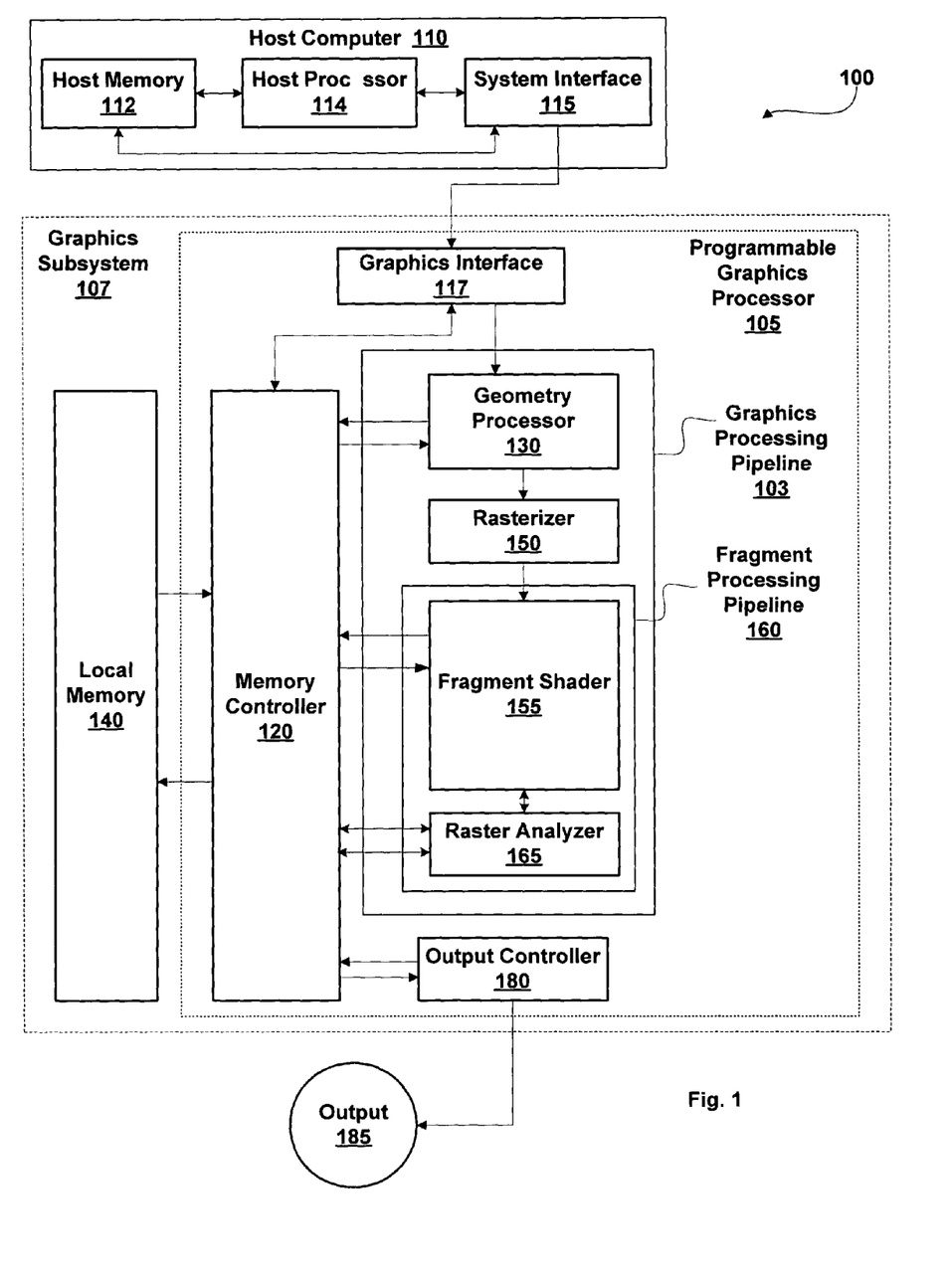
FIG. 1 is a block diagram of an exemplary embodiment of a respective computer system in accordance with one or more aspects of the present invention including a host computer and a graphics subsystem.

FIG. 1 is a block diagram of an exemplary embodiment of a Computing System generally designated 100 and including a Host Computer 110 and a Graphics Subsystem 107. Computing System 100 may be a desktop computer, server, laptop computer, palm-sized computer, tablet computer, game console, cellular telephone, computer based simulator, or the like. Host computer 110 includes Host Processor 114 that may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. Examples of System Interface 115 known in the art include Intel® Northbridge and Intel® Southbridge.

Host computer 110 communicates with Graphics Subsystem 107 via System Interface 115 and a Graphics Interface 117. Graphics Subsystem 107 includes a Local Memory 140 and a Programmable Graphics Processor 105. Programmable Graphics Processor 105 uses memory to store graphics data and program instructions, where graphics data is any data that is input to or output from computation units within Programmable Graphics Processor 105. Graphics memory is any memory used to store graphics data or program instructions to be executed by Programmable Graphics Processor 105. Graphics memory may include portions of Host Memory 112, Local Memory 140 directly coupled to Programmable Graphics Processor 105, register files coupled to the computation units within Programmable Graphics Processor 105, and the like.

In addition to Graphics Interface 117, Programmable Graphics Processor 105 includes a Graphics Processing Pipeline 103, a Memory Controller 120 and an Output Controller 180. Data and program instructions received at Graphics Interface 117 can be passed to a Geometry Processor 130 within Graphics Processing Pipeline 103 or written to Local Memory 140 through Memory Controller 120. Memory Controller 120 includes read interfaces and write interfaces that each generate address and control signals to Local Memory 140, storage resources, and Graphics Interface 117. Storage resources may include register files, caches, FIFOs (first in first out), and the like. In addition to communicating with Local Memory 140, and Graphics Interface 117, Memory Controller 120 also communicates with Graphics Processing Pipeline 103 and Output Controller 180 through read and write interfaces in Graphics Processing Pipeline 103 and a read interface in Output Controller 180. The read and write interfaces in Graphics Processing Pipeline 103 and the read interface in Output Controller 180 generate address and control signals to Memory Controller 120.

Within Graphics Processing Pipeline 105, Geometry Processor 130 and a programmable graphics fragment processing pipeline, Fragment Processing Pipeline 160, perform a variety of computational functions. Some of these functions are table lookup, scalar and vector addition, multiplication, division, coordinate-system mapping, calculation of vector normals, tessellation, calculation of derivatives, interpolation, and the like. Geometry Processor 130 and Fragment Processing Pipeline 160 are optionally configured such that data processing operations are performed in multiple passes through Graphics Processing Pipeline 103 or in multiple passes through Fragment Processing Pipeline 160. Each pass through Programmable Graphics Processor 105, Graphics Processing Pipeline 103 or Fragment Processing Pipeline 160 concludes with optional processing by a Raster Analyzer 165. Data produced in a pass through Programmable Graphics Processor 105, Graphics Processing Pipeline 103 or Fragment Processing Pipeline 160 may be written to an output buffer in graphics memory to be read from during a subsequent pass.

Vertex programs are sequences of vertex program instructions compiled by Host Processor 114 for execution within Geometry Processor 130 and Rasterizer 150. Shader programs are sequences of shader program instructions compiled by Host Processor 114 for execution within Fragment Processing Pipeline 160. Geometry Processor 130 receives a stream of program instructions (vertex program instructions and shader program instructions) and data from Graphics Interface 117 or Memory Controller 120, and performs vector floating-point operations or other processing operations using the data. The program instructions configure subunits within Geometry Processor 130, Rasterizer 150 and Fragment Processing Pipeline 160. The program instructions and data are stored in graphics memory. When a portion of Host Memory 112 is used to store program instructions and data the portion of Host Memory 112 can be uncached so as to increase performance of access by Programmable Graphics Processor 105. Alternatively, configuration information is written to registers within Geometry Processor 130, Rasterizer 150 and Fragment Processing Pipeline 160 using program instructions, encoded with the data, or the like.

Data processed by Geometry Processor 130 and program instructions are passed from Geometry Processor 130 to a Rasterizer 150. Rasterizer 150 is a sampling unit that processes graphics primitives and generates sub-primitive data, such as pixel data or fragment data. Graphics primitives include geometry, such as points, lines, triangles, quadrilaterals, meshes, surfaces, and the like. Rasterizer 150 converts graphics primitives into sub-primitive data, performing scan conversion on the data processed by Geometry Processor 130. Rasterizer 150 outputs fragment data or pixel data and shader program instructions to Fragment Processing Pipeline 160. Each fragment is at least a portion of a pixel, i.e., a pixel includes at least one fragment. Therefore the shader programs configure Fragment Processing Pipeline 160 to operate on fragments.

The shader programs configure the Fragment Processing Pipeline 160 to process fragment data by specifying computations and computation precision. A Fragment Shader 155 optionally is configured by shader program instructions such that fragment data processing operations are performed in multiple passes within Fragment Shader 155. Fragment Shader 155 outputs processed fragment data and codewords generated from shader program instructions to Raster Analyzer 165. Raster Analyzer 165 includes a read interface and a write interface to Memory Controller 120 through which Raster Analyzer 165 accesses data stored in one or more output buffers in Local Memory 140 or Host Memory 112. Raster Analyzer 165 optionally performs near and far plane clipping and raster operations, such as stencil, z test, blending, and the like, using fragment data read from the one or more buffers in Local Memory 140 or Host Memory 112 at the x,y position associated with the fragment data and the processed fragment data to produce output data. The output data from Raster Analyzer 165 is written back to an output buffer in Local Memory 140 or Host Memory 112 at the x,y position within the output buffer associated with the output data. Alternatively, the position is represented as a pair of coordinates other than x,y, e.g., (s,t), (u,v), and the like.

In various embodiments Memory Controller 120, Local Memory 140, and Geometry Processor 130 are configured such that data generated at various points along Graphics Processing Pipeline 103 may be output via Raster Analyzer 165 and provided to Geometry Processor 130 or Fragment Shader 155 as input. The output data is represented in one or more formats as specified by the codewords. For example, color data may be written as 16, 32, 64, or 128 bit per pixel fixed or floating-point RGBA (red, green, blue, and alpha) to be scanned out for display. Specifically, four 16 bit floating point components (RGBA) are combined forming 64 bits of color data for each fragment. The output data, e.g., color, depth, and other parameters, may be processed according to a shader program and stored in one or more output buffers in graphics memory to be used as texture maps, e.g., shadow map, height field, stencil, displacement maps, and the like, by the shader program. Alternatively, color and depth output data may be written to an output buffer, and later read and processed by Raster Analyzer 165 to generate the final pixel data prior to being scanned out for display via Output Controller 180.

When processing is completed, an Output 185 of Graphics Subsystem 107 is provided using Output Controller 180. Alternatively, Host Processor 114 reads the composited frame, e.g., output buffer, stored in Local Memory 140 through Memory Controller 120, Graphics Interface 117 and System Interface 115. Output Controller 180 is optionally configured by opcodes, received from Graphics Processing Pipeline 103 via Memory Controller 120, to deliver data to a display device, network, electronic control system, other Computing System 100, other Graphics Subsystem 110, or the like.

In an embodiment, Fragment Processing Pipeline 160 is configured by shader program instructions to perform depth testing prior to shading. Computed depth values are stored in a writable and readable output buffer, e.g., depth buffer. Conventionally, a shading unit, such as Fragment Shader 155, may not read the depth buffer and depth testing is performed by Raster Analyzer 165. The depth buffer may be copied to a buffer that may be read by a conventional shading unit. In contrast, various embodiments of Fragment Processing Pipeline 160 may be configured to read values from the depth buffer using a read interface that may also be used to read texture data, without copying the depth buffer.

Figure 2A:
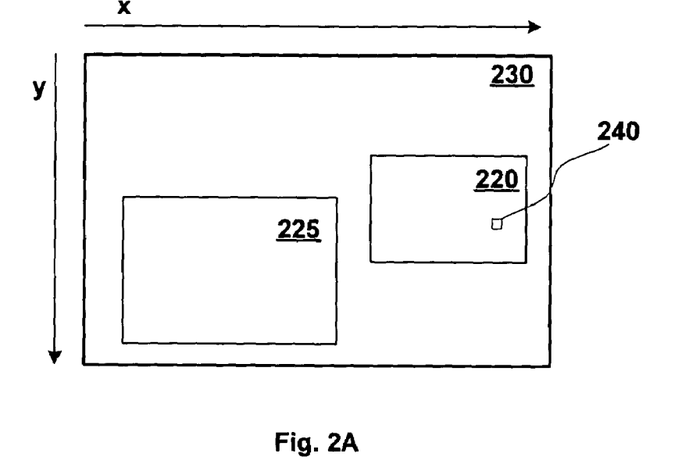
FIG. 2A is a conceptual diagram of an output buffer used by a display device.

FIG. 2A is a conceptual diagram of an Output Buffer 220 and an Output Buffer 325 displayed by a display device, e.g., monitor, projector, and the like. Data stored in Output Buffer 220 and data stored in Output Buffer 225 are displayed on Display 230. Additional buffers of arbitrary sizes may be displayed on Display 175. Each output buffer may be positioned for display relative to Display 175. Furthermore, a position within Display 230 may be represented as a pair of coordinates, e.g., (x,y), (s,t), (u,v), and the like.

A Fragment 240, such as a pixel, within displayed Buffer 220 is associated with an x,y position relative to Display 175. For example, displayed Output Buffer 220 is positioned at an x offset and a y offset relative to the upper left corner of Display 175. The x,y position of Fragment 240 relative to upper left corner of Display 175, i.e., screen position, is determined by combining the x offset and y offset with the x,y position of Fragment 240 within displayed Output Buffer 220, e.g. relative to the upper left corner of displayed Output Buffer 220. The x,y position of Fragment 240 relative to displayed Output Buffer 220, i.e., window position, is consistent regardless of the position of displayed Output Buffer 1020 within Display 175. In an alternate embodiment the x,y origin is in the upper left corner of Display 175 and the x,y position of Fragment 240 is described relative to the x,y origin. In this embodiment the x,y position of Fragment 240 changes as the position of displayed Output Buffer 220 within Display 175 changes.

Figure 2B:
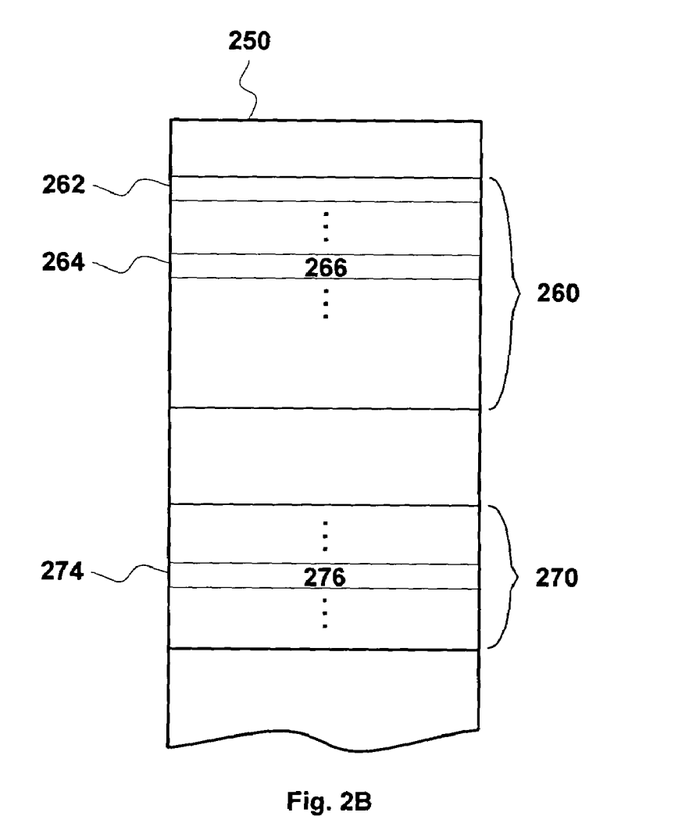
FIG. 2B is a conceptual diagram of output buffers stored in graphics memory.

FIG. 2B illustrates a Portion of Graphics Memory 250 including memory locations storing data for Output Buffer 220 and Output Buffer 225. Memory locations within Section 260 store data for Output Buffer 220. For example, a Memory Location 266 stores data associated with Fragment 240, e.g., color, depth, stencil, shadow depth, map data, and the like. Each fragment produced by Programmable Graphics Processor 105 uses a predefined amount of memory space for storing fample data. A size of Section 260 is equal to the number of Memory Locations 266 contained in Section 260 multiplied by the size of a Memory Location 266. The size of a Memory Location 266 can be any number of bits as specified in hardware or software. An output buffer may include data represented in an 8 bit fixed point format, a 16 bit fixed point format, a 16 bit floating point format, a 32 bit floating point format, and the like. The number of memory locations contained in a section can vary for each output buffer.

A Memory Location Address 264 is used to access Memory Location 266. Memory Location Address 264 may be computed based on an x,y position within Output Buffer 220 and a base memory space address, Memory Location Address 262, corresponding to a first location within Section 260. In an alternate embodiment Memory Location Address 264 is computed based on an x,y position within Display 175, an x offset of displayed Output Buffer 220, a y offset of displayed Output Buffer 220, and Memory Location Address 262.

Memory locations within a Section 270 store data for Output Buffer 225. For example, a Memory Location 276 stores data associated with Fragment 245, e.g., color, depth, stencil, shadow depth, map data, and the like. Section 270 has a base memory space address. Each output buffer is associated with a unique output buffer identifier that may be used to determine the output buffer's corresponding base memory space address. For example a lookup table containing the base memory space address corresponding to each output buffer identifier may be stored in Graphics Processing Pipeline 103.

A pixel load shader instruction, PLD shader program instruction, may be used to read data from an output buffer. The PLD instruction includes a source position and a destination address. The source position may specify a location within a writable output buffer such as Output Buffer 225 or Output Buffer 220. Data is read from the source position and stored in a storage element within Fragment Shader 155, described further herein, corresponding to the destination address. The data read from the source position is converted to a data format associated with the destination address. For example, when the destination address corresponds to a 32 bit floating point data format and the data read from the source position is represented in a 16 bit floating point data format, the data read form the source position is converted to a 32 bit floating point data format. Alternatively, when the destination address corresponds to an 8 bit fixed point data format and the data read from the source position is represented in a 24 bit floating point data format, the data read form the source position is converted to a 24 bit floating point data format.

When pixel load enable is enabled and a pixel load shader program instruction is received by Fragment Shader 155, the source position read is "current". Fragment Shader 155 ensures that the data read from an output buffer is "current" by confirming that all pending write accesses (initiated prior to receiving the PLD instruction) to the writable output buffer are completed prior to reading the output buffer, as described further herein. When pixel load enable is disabled and a pixel load shader program instruction is received a predetermined value, such as zero is loaded into the storage element corresponding to the destination address. In some embodiments pixel load enable is enabled or disabled using a pixel load enable shader program instruction. Furthermore, the pixel load enable instruction may include an enable bit or field for each output buffer.

For example, Output Buffer 225 is a color buffer, storing color data, e.g. texture data, being produced by Graphics Processing Pipeline 103. The color data is read from Output Buffer 225 using PLD instructions (after enabling Output Buffer 225 using the pixel load enable instruction) to produce data stored in Output Buffer 220. PLD instructions are used to read directly from Output Buffer 225 via a read interface in Fragment Shader 155 without first copying Output Buffer 225 to a read-only buffer.

In an embodiment fragments written to Output Buffer 220 are processed by depth testing prior to shading. When a fragment produces data for Pixel 240 in Output Buffer 220 a write to Memory Location Address 264 may be pending for several clock cycles depending on the number of pipeline stages in Fragment Processing Pipeline 160, arbitration scheme used by Memory Controller 120, and the like. A RAW (read after write) conflict exists when a write to an (x,y) position, e.g., Pixel 240, within an output buffer is pending when a read from the same (x,y) position in the output buffer is received. Specifically, a RAW conflict exists in the embodiment when a read from Memory Location Address 264 is received while a write to Memory Location Address 264, is pending. The RAW conflict is removed when the write to Memory Location Address 264 is completed.

Flushing Fragment Processing Pipeline 160 prior to reading from Output Buffer 220 ensures that the data read from Output Buffer 220 is current by confirming that all pending write accesses (initiated prior to processing the flush instruction) to the writable output buffer are completed prior to reading the output buffer. Conventionally, a flush instruction idles the computation units within Fragment Processing Pipeline 160 as the flush instruction passes through Fragment Processing Pipeline 160, reducing fragment throughput. It is desirable to read from a writable output buffer to process fragment data without flushing Fragment Processing Pipeline 160 or minimizing the number of times Fragment Processing Pipeline 160 is flushed. The pixel load instruction and pixel load enable instruction may be used to read a writable output buffer and minimize flushing of Fragment Processing Pipeline 160, as described further herein.

Figure 3:
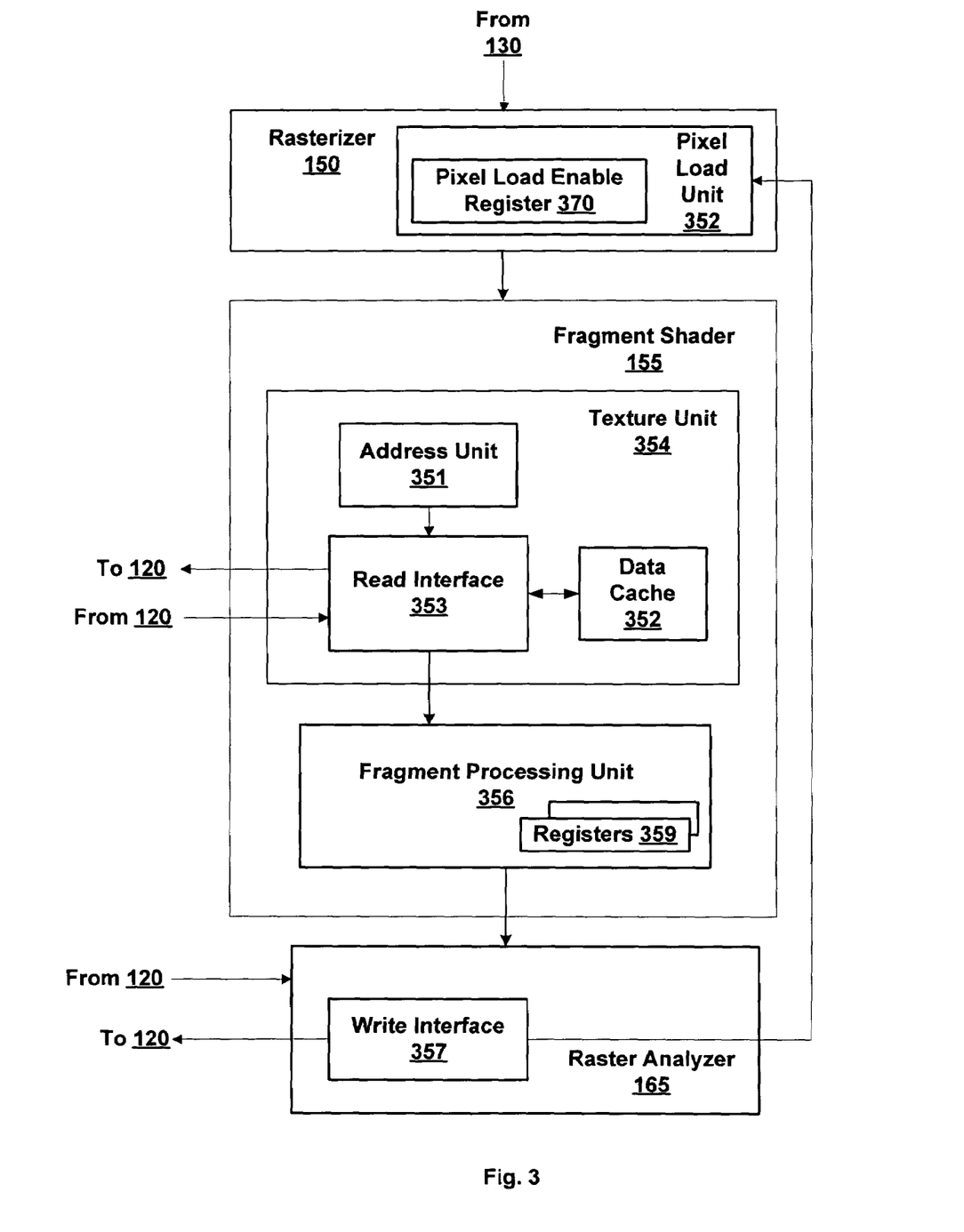
FIG. 3 is a block diagram of an exemplary embodiment of portions of Fragment Processing Pipeline of FIG. 1 in accordance with one or more aspects of the present invention.

FIG. 3 is a block diagram of an exemplary embodiment of portions of Graphics Processing Pipeline 103 in accordance with one or more aspects of the present invention. Rasterizer 150 receives primitive data from Geometry Processor 130 and produces fragment data and sync bundles. Shader program instructions received by Rasterizer 150 are passed through the Fragment Shader 155. A sync bundle is produced to track writes to one or more output buffers. The sync bundle passes through Fragment Shader 155 and is processed by Raster Analyzer 165.

Rasterizer 150 includes a Pixel Load Unit 352, described further herein, and a Pixel Load Enable Register 370. Pixel Load Enable Register 370 stores one or more bits, each bit corresponding to an output buffer, such as a front color buffer, back color buffer, depth/stencil buffer, texture buffer, and the like. In an alternate embodiment each bit may correspond to a type of output buffer, such as display buffers, texture buffers, shadow buffers, and the like. Pixel Load Enable Register 370 may have a default value and may be loaded by an application using the pixel load enable program instruction.

Fragment Shader 155 receives fragment data, sync bundles, and shader program instructions from Rasterizer 150. The fragment data is processed according to the shader program instructions. Address Unit 351 determines an address corresponding to a position associated with each fragment. The address may be determined using the position, a base address, offsets, and the like. Address Unit 351 outputs the address to Read Interface 353 which reads additional shader program instructions and output buffer data (depth values, texture map, height field, bump map, shadow map, jitter values, and the like) from Local Memory 140 or Host Memory 112, via Memory Controller 120. The output buffer data stored in graphics memory may be generated by Programmable Graphics Processor 105, by Host Processor 114, by another device, by a human, or the like.

In an embodiment including a Data Cache 352, Read Interface 353 determines if the additional shader program instructions or output buffer data are available in Data Cache 352. If the output buffer data is available in Data Cache 352, Read Interface 353 reads the output buffer data from Data Cache 352 rather than from Local Memory 140 or Host Memory 112, via Memory Controller 120. When a sync bundle is received output buffer data stored in Data Cache 352 is marked as invalid so that Read Interface 353 will read the output buffer data from Local Memory 140 or Host Memory 112, via Memory Controller 120 to receive the output buffer data that is current.

Memory Controller 120 outputs the output buffer data and the additional shader program instructions to Read Interface 353. Texture Unit 354 outputs the buffer data, processed fragment data, sync bundles, and the additional shader program instructions to a Fragment Processing Unit 356. Registers 359 within Fragment Processing Unit 356 are storage elements used to store data represented by a plurality of bits. Each Register 359 may be specified as a destination location by a PLD instruction and is loaded during processing of the PLD instruction. Fragment Processing Unit 356 processes the processed buffer data and processed fragment data as specified by the additional shader program instructions and outputs shaded fragment data, e.g., x, y, color, depth, configuration control, other parameters, and sync bundles to Raster Analyzer 165.

In some embodiments Fragment Processing Unit 356 is configured to process at least two fragments in parallel. Likewise, Read Interface 353 may also be configured to process at least two fragments in parallel. Raster Analyzer 165 optionally processes the shaded fragment data according to the configuration control. A Write Interface 357 within Raster Analyzer 165 writes the optionally processed shaded fragment data to an output buffer stored in Local Memory 140 or Host Memory 112, via Memory Controller 120. Write Interface 357 also outputs the sync bundles to Pixel Load Unit 352 within Rasterizer 150, as described further herein.

Figure 4:
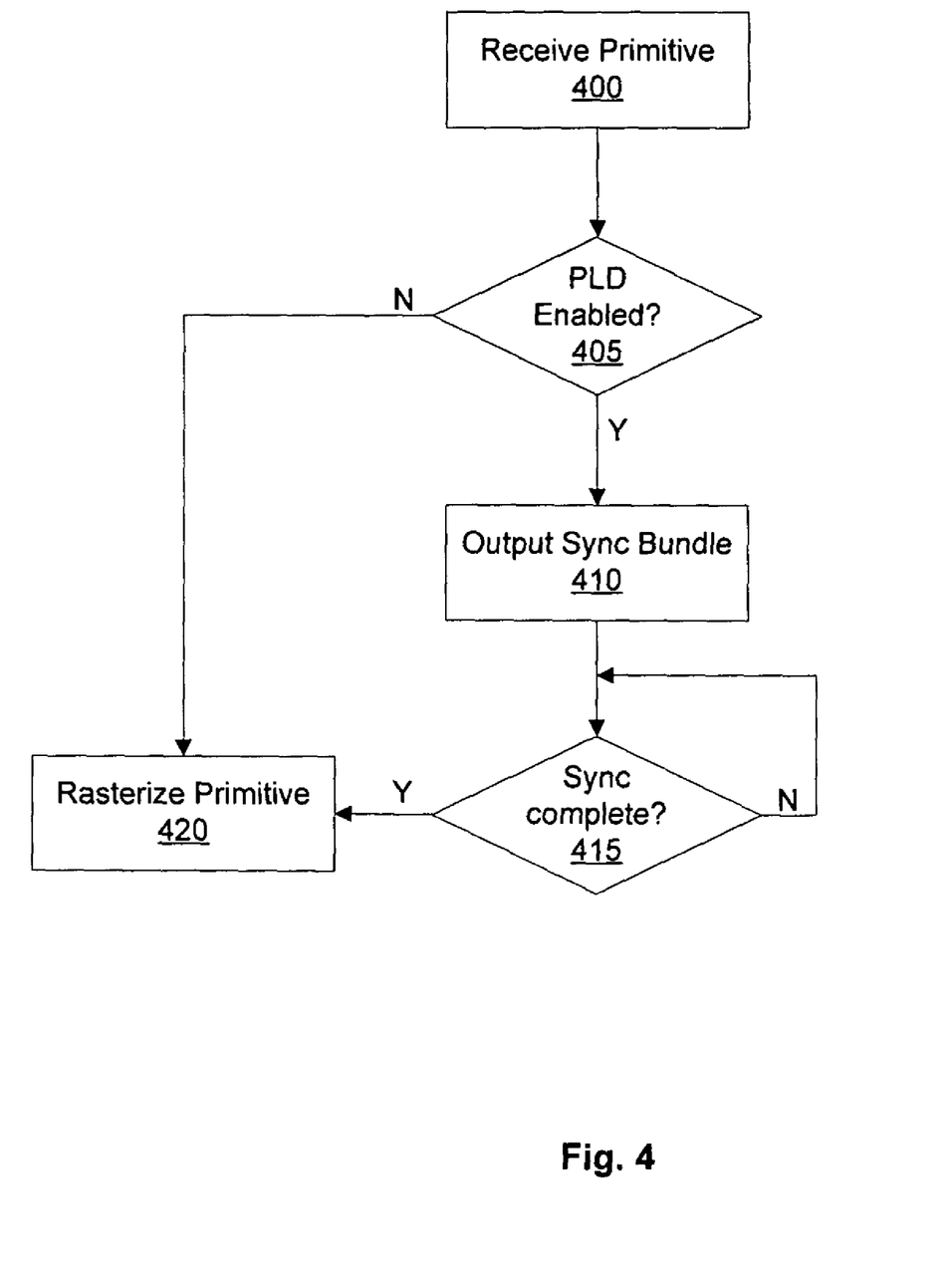
FIG. 4 illustrates an embodiment of a method in accordance with one or more aspects of the present invention.

FIG. 4 illustrates a method of processing graphics data in accordance with one or more aspects of the present invention. In this method a sync bundle is output per primitive. A RAW conflict may not exist during processing of fragments within a primitive, so it is not necessary to output a sync bundle more frequently. In step 400 a primitive is received by Rasterizer 150. The primitive is associated with an output buffer and in step 405, Rasterizer 150 determines if pixel load enable is enabled for the output buffer by reading Pixel Load Enable Register 370. If in step 405 Rasterizer 150 determines pixel load enable is not enabled for the output buffer, Rasterizer 150 proceeds to step 420. If, in step 405 Rasterizer 150 determines pixel load is enabled for the output buffer, in step 410 Rasterizer 150 outputs a sync bundle to Fragment Shader 155.

In step 415 Rasterizer 150 determines if processing of the sync bundle is complete, i.e., the sync bundle output in step 410 has propagated through Fragment Processing Pipeline 160. Write Interface 357 is configured to output a sync bundle after data preceding the sync bundle has been output to Memory Controller 120. In an alternate embodiment, Write Interface 357 is configured to output a sync bundle after the data preceding the sync bundle has been output by Memory Controller 120 to graphics memory. If, in step 415 Rasterizer 150 determines processing of the sync bundle is not complete Rasterizer 150 remains in step 415. If, in step 415 Rasterizer 150 determines processing of the sync bundle is complete, in step 701 Rasterizer 150 rasterizes the primitive received in step 400. Outputting one sync bundle for each primitive prevents RAW conflicts caused by overlapping or adjacent primitives accessing the same position within an output buffer.

Figure 5A:
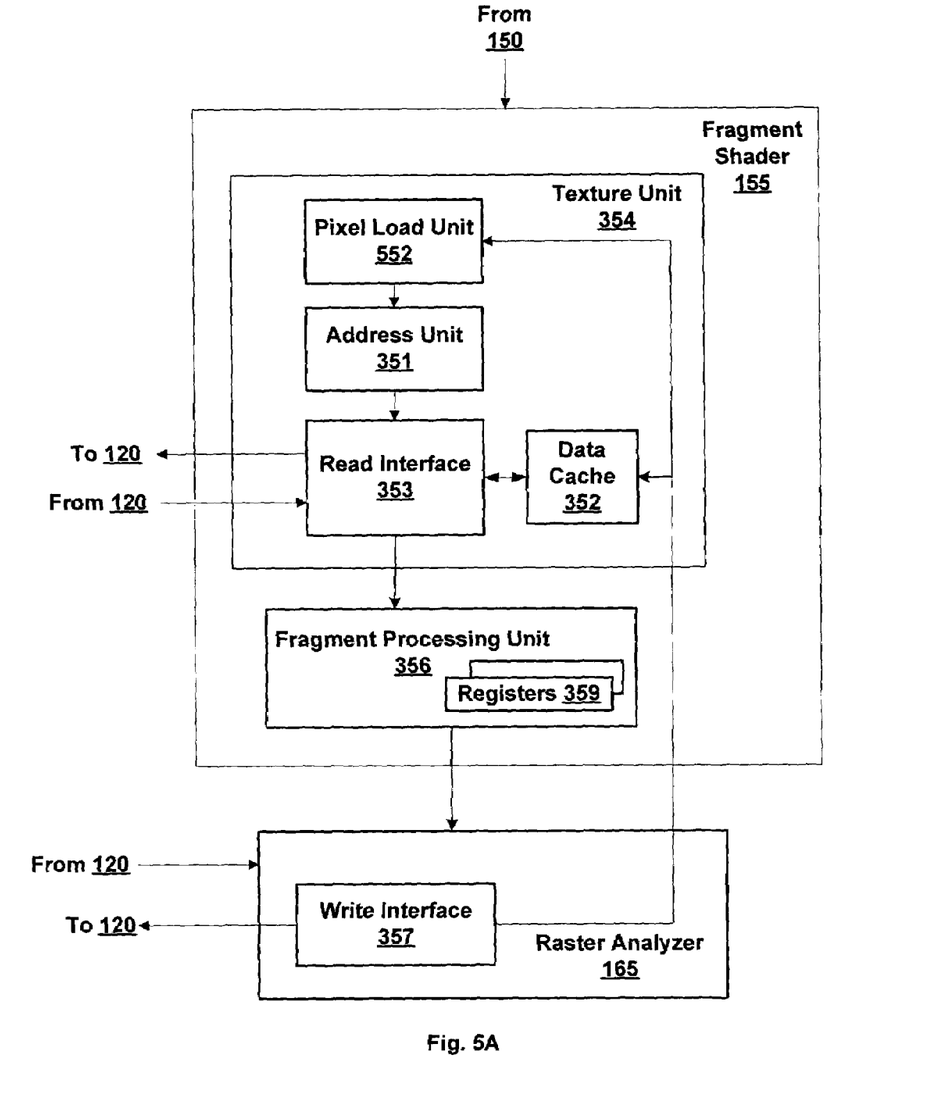
FIG. 5A is a block diagram of an exemplary embodiment of portions of Fragment Processing Pipeline of FIG. 1 in accordance with one or more aspects of the present invention.

FIG. 5A is a block diagram of an exemplary embodiment of portions of Fragment Shader 155 in accordance with one or more aspects of the present invention. Fragment Shader 155 receives fragment data and shader program instructions from Rasterizer 150. The fragment data is processed according to the shader program instructions. A fragment is associated with a position corresponding to a location in an output buffer. During processing the position may be read from or written to as specified by the shader program instructions. Other fragments may be associated with either the location in the output buffer, other locations in the output buffer, or locations in another output buffer. In an alternate embodiment additional Fragment Shaders 155 are included within Fragment Processing Pipeline 160 and fragment data associated with a particular position is processed by a one Fragment Shader 155. For example, one Fragment Shader 155 processes fragment data associated with (x,y) positions where y is modulo n vertically and modulo m horizontally, e.g., every nth position in every mth scanline, and the like.

A Pixel Load Unit 552 receives a position associated with each fragment and pixel load enable instructions. Pixel Load Unit 552 performs pixel collision detection using the position, as described further herein. Pixel Load Unit 552 produces sync bundles that are output by Texture Unit 354 to Fragment Processing Unit 356. A sync bundle may contain a timestamp or other value to differentiate one sync bundle from another sync bundle. Pixel Load Unit 552 outputs the position associated a fragment to Address Unit 351.

Address Unit 351, Read Interface 353, optional Data Cache 352, Texture Unit 354, Fragment Processing Unit 356 including Registers 359, and Raster Analyzer 165 function as previously described in relation to FIG. 3. Write Interface 357 within Raster Analyzer 165 outputs the sync bundles to Pixel Load Unit 552.

Figure 5B:
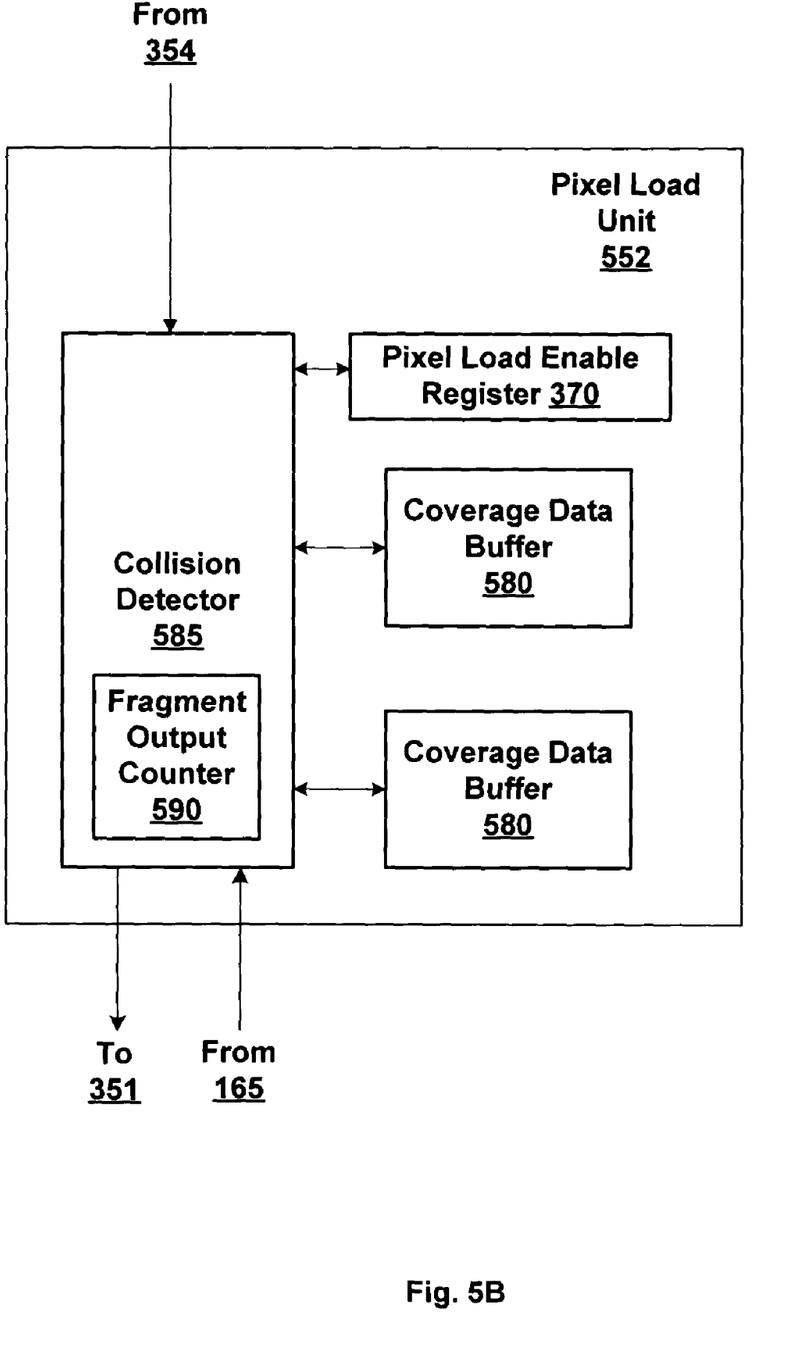
FIG. 5B is a block diagram of an exemplary embodiment of the Pixel Load Unit of FIG. 5A in accordance with one or more aspects of the present invention.

FIG. 5B is a block diagram of an exemplary embodiment of Pixel Load Unit 552 in accordance with one or more aspects of the present invention. Pixel Load Unit 552 includes Pixel Load Enable Register 370, a Collision Detector 585, and Coverage Data Buffers 580. Collision Detector 585 receives a position associated with a fragment and determines if data stored at a location in an output buffer associated with the position may not be current. In some embodiments Collision Detector 585 determines if data stored at a location within a specific output buffer (corresponding to an output buffer identifier) associated with the position may not be current. A Fragment Output Counter 590 within Collision Detector 585 compares a predetermined value to a count of the number of fragments output by Pixel Load Unit 552 to Address Unit 351. Coverage Data Buffers 580 are storage resources configured to store pixel coverage information based on positions associated with fragments output by Pixel Load Unit 552 to Address Unit 351. Collision Detector 585 produces and outputs sync bundles using pixel load enable data read from Pixel Enable Register 370, pixel coverage data read from Coverage Data Buffers 580, and sync bundles received from Raster Analyzer 165, as described further herein.

Figure 6:
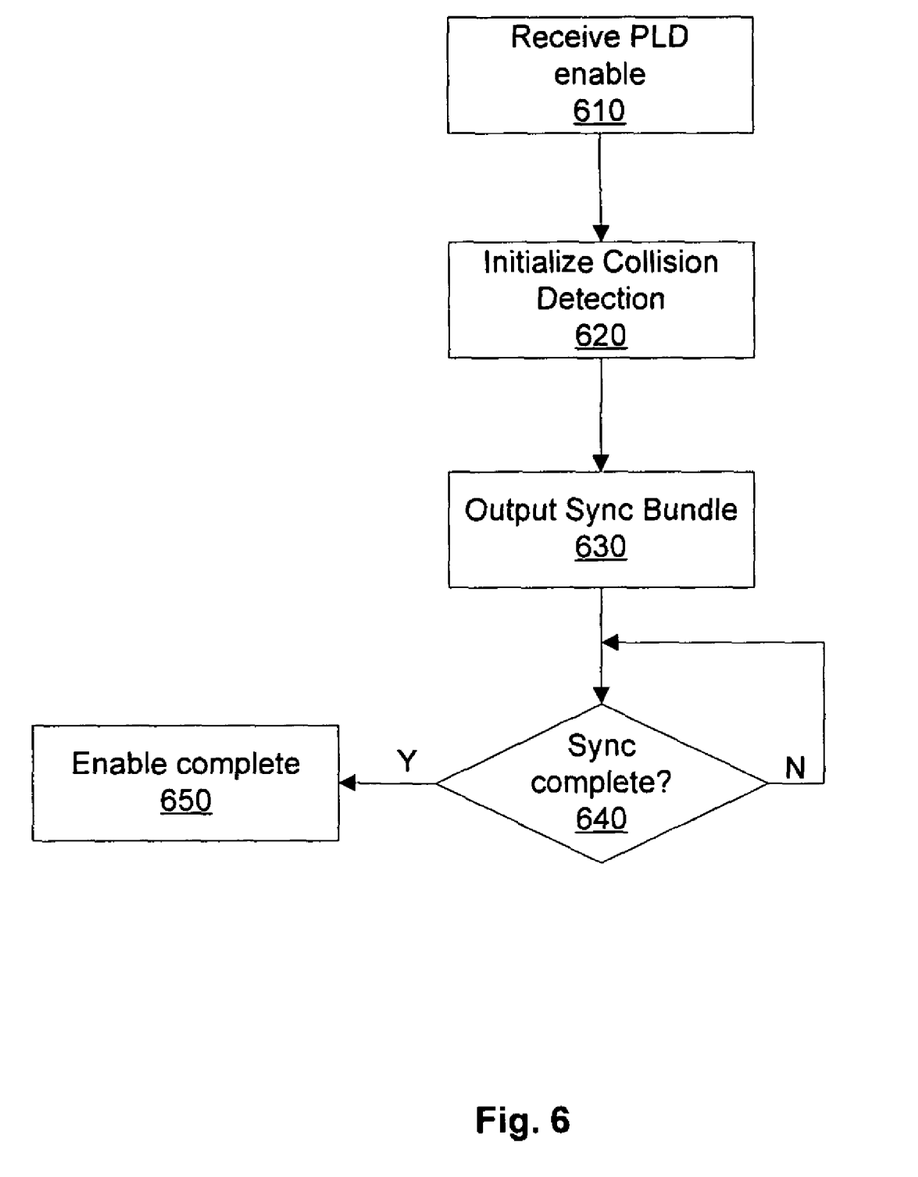
FIG. 6 illustrates an embodiment of a method of processing a pixel load enable instruction in accordance with one or more aspects of the present invention.

FIG. 6 illustrates an embodiment of a method of processing a pixel load enable instruction in accordance with one or more aspects of the present invention. Processing the pixel load enable instruction configures Fragment Processing Pipeline 160 to track pixel coverage data. In step 610 Pixel Load Unit 552 receives a pixel load enable instruction, including data to store in Pixel Load Enable Register 370. In an alternate embodiment a pixel load enable instruction includes bits to set or clear bits in Pixel Enable Register 370. Enabling a bit in Pixel Load Enable Register 370 initiates pixel coverage tracking for one or more output buffers. In step 620 Collision Detector 585 initializes Coverage Data Buffers 580 by setting each bit to a predetermined value, such as a one or a zero. Collision Detector 585 configures one Coverage Data Buffer 580, the "selected" Coverage Data Buffer 580, to be readable and writable and the other Coverage Data Buffer 580, the "non-selected" Coverage Data Buffer 580, to be readable and not writable.

In step 630 Collision Detector 585 generates and outputs a sync bundle to Address Unit 351. In step 640 Collision Detector 585 determines if processing of the sync bundle is complete, i.e., if the sync bundle output in step 630 has been received and processed by Raster Analyzer 165, i.e., has been received by Collision Detector 585 from Raster Analyzer 165. If, in step 640 Collision Detector 585 determines processing of the sync bundle is not complete Collision Detector 585 remains in step 640. If, in step 640 Collision Detector 585 determines processing of the sync bundle is complete, in step 650 Collision Detector 585 is configured to track fragment positions. The pixel load instruction and pixel load enable may be used to read a writable output buffer and minimize idling of computation units within Fragment Processing Pipeline 160, as described further herein.

Figure 7:
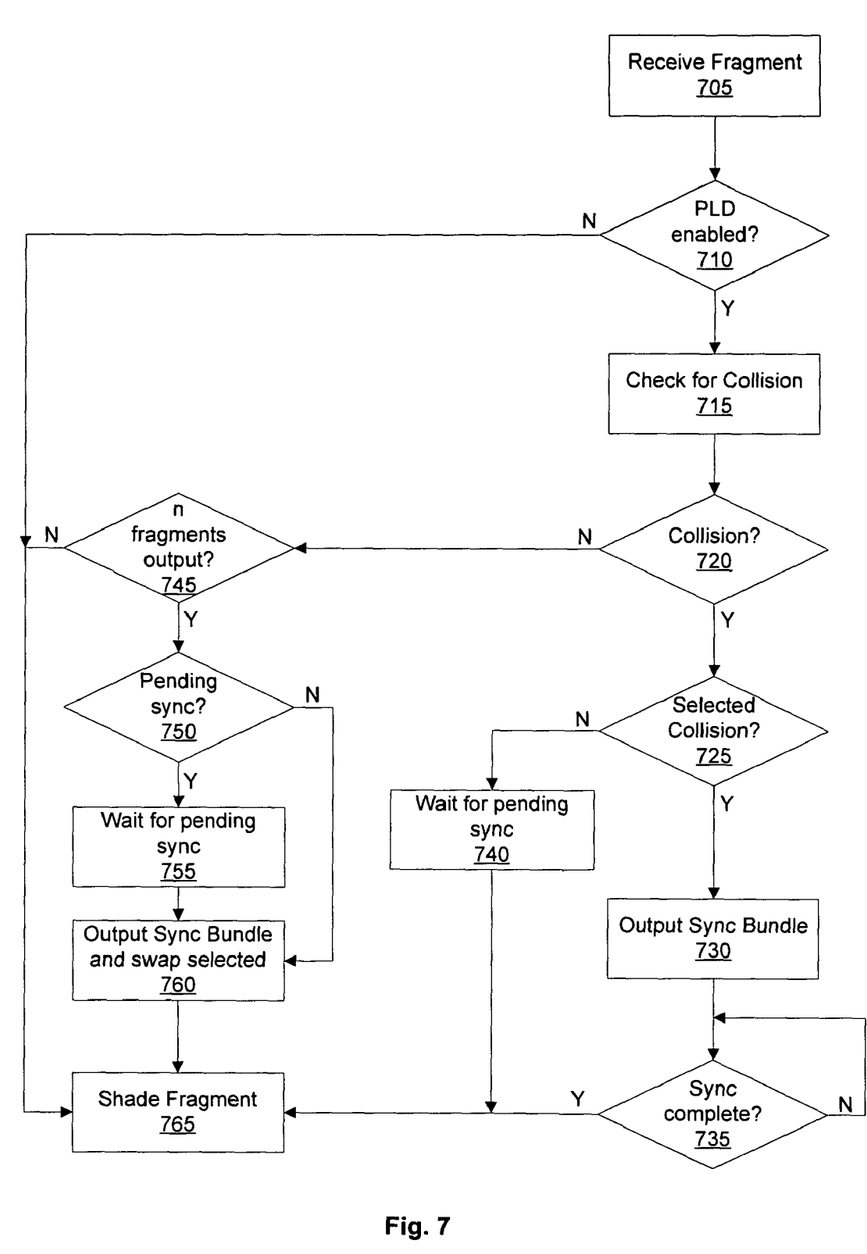
FIG. 7 illustrates an embodiment of a method in accordance with one or more aspects of the present invention.

FIG. 7 illustrates an embodiment of a method in accordance with one or more aspects of the present invention. In this embodiment a sync bundle is output per pixel collision, described further herein, rather than per primitive as in the method shown in FIG. 4. In step 705 Fragment Processing Pipeline 160 receives a fragment associated with a position. In step 710 Collision Detector 585 within Pixel Load Unit 552 receives the position and determines if pixel load enable is enabled. When more than one output buffer is used Pixel Load Unit 552 may also receive an output buffer identifier and uses the output buffer identifier to determine if pixel load enable is enabled for the output buffer associated with the output buffer identifier. If, in step 710 Collision Detector 585 determines that pixel load enable is not enabled, Pixel Load Unit 552 outputs the position to Address Unit 351 and Fragment Processing Pipeline 160 proceeds to step 765.

If, in step 710 Collision Detector 585 determines that pixel load enable is enabled, in step 715 Collision Detector 585 checks if a pixel collision exists. A pixel collision exists when a fragment associated with a position has been output by Pixel Load Unit 552 and if a sync bundle has been sent after outputting the fragment, the sync bundle has not yet been received from Raster Analyzer 165 by Pixel Load Unit 552. Collision Detector 585 reads Coverage Data Buffers 580. Because Coverage Data Buffers 580 were cleared to zero when a pixel load enable instruction was executed, Collision Detector 585 reads a zero from each Coverage Data Buffer 580. When Collision Detector 585 reads the writable (selected) Coverage Data Buffer 580, the bit read is set to a one, indicating that a fragment associated with the position has been output. In one embodiment the position is a pair of x,y coordinates, e.g. a destination pixel. In another embodiment the position is a pair of output buffer coordinates used to read texture data, a shadow depth value, or the like.

In step 720 Collision Detector 585 determines if a pixel collision exists, and, if not, proceeds to step 745. A pixel collision exists if the coverage data read from either Coverage Data Buffer 580 is a one. In step 745 Collision Detector 585 determines if a predetermined number of fragments (positions) have been output by Pixel Load Unit 552, and, if not, in step 765 Collision Detector 585 outputs the position to Address Unit 351 and increments Fragment Output Counter 590. In an alternate embodiment Fragment Output Counter 590 is initialized to the predetermined number and Collision Detector 585 decrements the counter for each fragment output. In the alternate embodiment Collision Detector 585 determines the predetermined number of fragments have been output by Pixel Load Unit 552 when Fragment Output Counter 590 outputs a zero. The predetermined number may be fixed or loaded using a program instruction.

Following step 765, Texture Unit 352 outputs the fragment associated with the position to Fragment Processing Unit 356 and the fragment is shaded. Fragment Processing Pipeline 160 receives several other fragments and steps 705, 710, 715, 720, 745, and 765 are repeated. Collision Detector 585 increments Fragment Output Counter 590 each time step 765 is completed. Fragment Processing Pipeline 160 receives another fragment associated with the position and steps 705, 710, and 715 are repeated. In step 720 Collision Detector 585 determines if a pixel collision exists, and, if so, in step 725 Collision Detector 585 determines if the pixel collision is due to a read from the selected Coverage Data Buffer 580. If, in step 725 Collision Detector 585 determines the pixel collision is due to a read from the selected Coverage Data Buffer 580, in step 730 Collision Detector 585 outputs a sync bundle to Address Unit 351.

In step 735 Collision Detector 585 waits to receive the sync bundle from Raster Analyzer 165, remaining in step 735 until the sync is complete. In step 735, when Collision Detector 585 receives the sync bundle it clears selected Coverage Data Buffer 580, except for the bit indicating that a fragment associated with the position has been output, and proceeds to step 765 and outputs the position to Address Unit 351 and increments Fragment Output Counter 590. Fragment Processing Pipeline 160 receives another fragment associated another position and steps 705, 710, and 715 are repeated. In step 720 Collision Detector 585 determines if a pixel collision exists, and, if not, in step 745 Collision Detector 585 determines if the predetermined number of fragments (positions) have been output by Pixel Load Unit 552. If, in step 745 Collision Detector 585 determines the predetermined number of fragments (positions) have been output by Pixel Load Unit 552, in step 750 Collision Detector 585 determines if there is a pending sync, i.e., if a sync bundle output by Pixel Load Unit 552 has not yet been received from Raster Analyzer 165. A pending sync may result from the predetermined number being set to a number that is smaller than the number of pipeline stages in Fragment Processing Pipeline 160.

If, in step 750 there is a pending sync, in step 755 Collision Detector 585 waits for the pending sync to complete, clearing the non-selected Coverage Data Buffer 580 and proceeding to step 760 when the sync bundle is received by Pixel Load Unit 552 from Raster Analyzer 165. If, in step 750 there is not a pending sync, Collision Detector 585 proceeds to step 760. In step 760 Collision Detector 585 outputs a sync bundle, clears Fragment Output Counter 590, and "swaps" Coverage Data Buffers 580 so that the writable Coverage Data Buffer 580 is only readable (non-selected) and the readable Coverage Data Buffer 580 is writable and readable (selected). In step 765 Collision Detector 585 outputs the other position to Address Unit 351 and increments Fragment Output Counter 590.

Fragment Processing Pipeline 160 receives another fragment associated with the position and steps 705, 710, and 715 are repeated. In step 720 Collision Detector 585 determines if a pixel collision exists, and, if so, in step 725 Collision Detector 585 determines if the pixel collision is due to a read from the selected Coverage Data Buffer 580. A pixel collision may exist due to a read from the non-selected Coverage Data Buffer 580 when the sync bundle output in step 760 has not yet been received by Pixel Load Unit 552 from Raster Analyzer 165. If, in step 725 Collision Detector 585 determines the pixel collision is not due to a read from the selected Coverage Data Buffer 580, in step 740 Collision Detector 585 waits for the pending sync to be received by Pixel Load Unit 552 from Raster Analyzer 165 before clearing the non-selected Coverage Data Buffer 580 and proceeding to step 765. In step 765 Collision Detector 585 outputs the position to Address Unit 351 and increments Fragment Output Counter 590. Note that when the selected Coverage Data Buffer 580 was read in step 715 a one was stored for the position.

In this embodiment sync bundles are generated and output by Pixel Load Unit 552 when a pixel collision exists or when a predetermined number of fragments have been output to Address Unit 351. This embodiment ensures that data read from a writable output buffer is current while minimizing idling computation units within Fragment Processing Pipeline 160 to process sync bundles by only waiting for the sync bundles to be received by Pixel Load Unit 552 from Raster Analyzer 165 when a pixel collision exists. Several primitives may be processed without generating a sync bundle.

Figure 8:
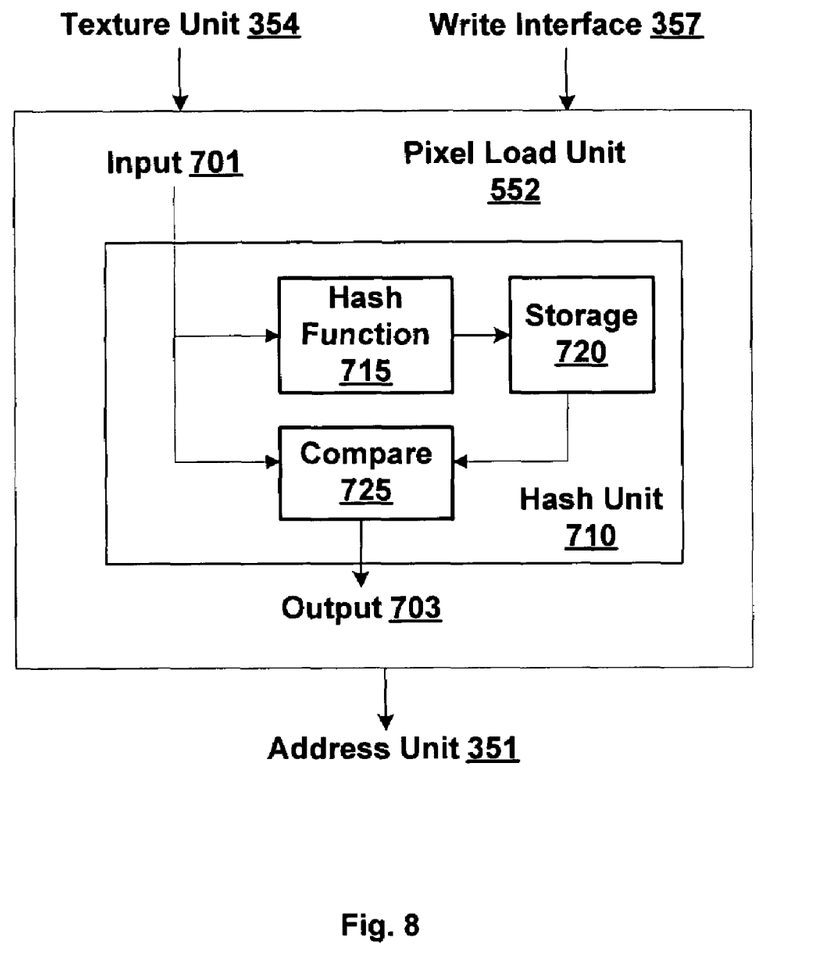
FIG. 8 is a block diagram of an exemplary embodiment of a portion of the Pixel Load Unit of FIG. 5A in accordance with one or more aspects of the present invention.

In some embodiments sync bundles are not generated and output by Pixel Load Unit 552. Instead, destination locations for write data are tracked and position conflicts, e.g., pixel collisions, are avoided by delaying source read requests. FIG. 8 is a block diagram of an exemplary embodiment of a portion of Pixel Load Unit 552 including subunits configured to detect position conflicts in accordance with one or more aspects of the present invention.

A Hash Unit 710 receives an Input 701 produces an Output 703. Input 701 may include a buffer identifier, a position (source location or destination location), a source read request, a destination write request, and a destination write confirmation. The source read request is asserted when a shader program instruction specifies a read. The destination write request is asserted when a shader program instruction specifies a write. The destination write confirmation is received from Write Interface 357 when a write is completed (write position confirmation). A Hash Function 715 within Hash Unit 710 receives a first portion of Input 701 and outputs an index. When the destination write request is asserted a second portion of Input 701 is stored in an entry in a Storage 720, where Storage 720 may be a register file, embedded RAM, or the like. When the destination write confirmation is received the entry corresponding to the index is cleared or otherwise marked as available.

When the source read request is asserted Storage 720 outputs the data stored in the entry corresponding to the index to a Compare 725. Compare 725 also receives the second portion of Input 701 and compares it to the data output by Storage 720. When the second portion of Input 701 is equal to the data output by Storage 720 Compare 725 outputs a signal indicating that a position conflict exists. When the second portion of Input 701 is not equal to the data output by Storage 720 Compare 725 outputs a signal indicating that a position conflict does not exist.

In a first embodiment the first portion of Input 701 is the position and the buffer identifier is the second portion of Input 701. In a second embodiment the first portion of Input 701 is the buffer identifier and the second portion of Input 701 is the position. In a third embodiment the first portion of Input 701 is the buffer identifier and the position and the second portion of Input 701 is a logic true. In the third embodiment Compare 725 is omitted and Output 703 is the output of Storage 720.

Figure 9A:
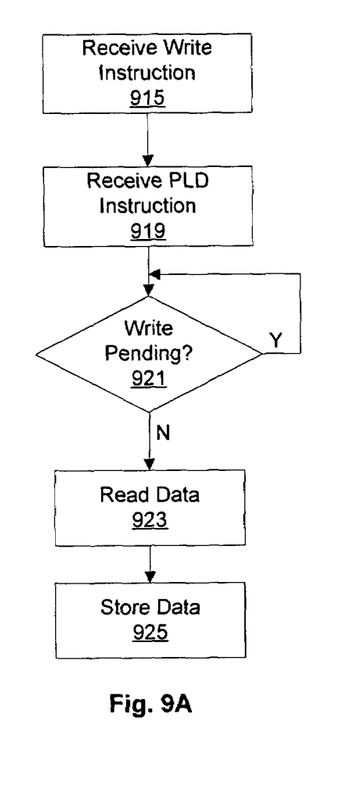
FIGS. 9A, 9B, 9C, and 9D illustrate embodiments of methods of processing shader program instructions in accordance with one or more aspects of the present invention.
Figure 9B:
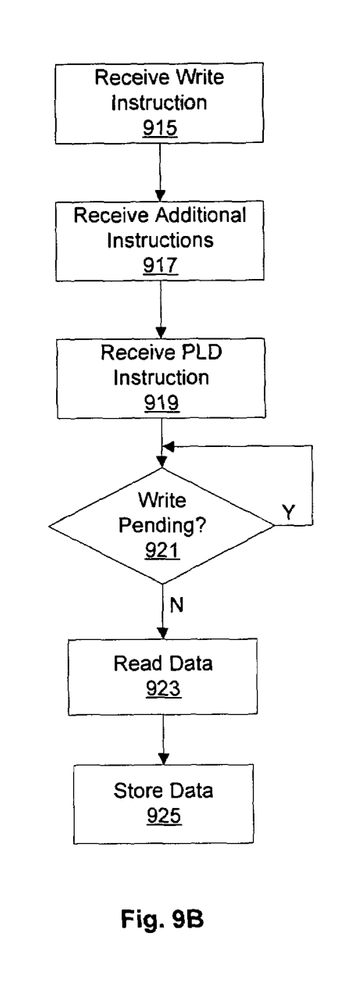
Figure 9C:
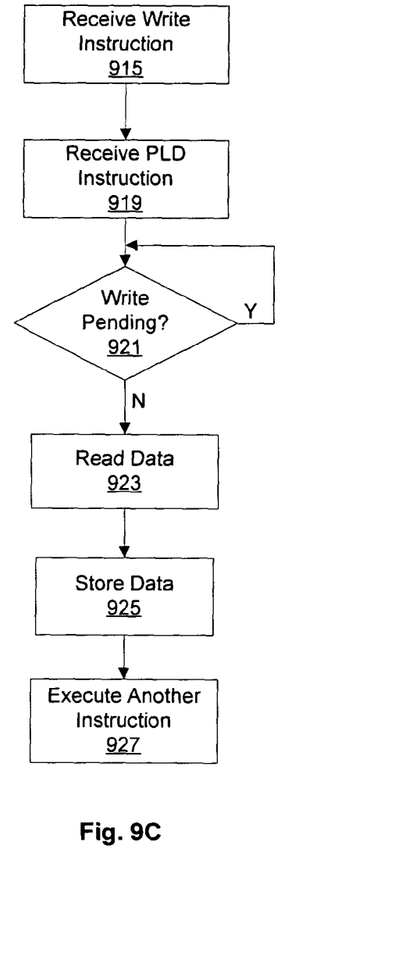

FIGS. 9A, 9B, and 9C illustrate embodiments of methods of processing shader program instructions, including a PLD instruction in accordance with one or more aspects of the present invention. An API (Application Programming Interface) for a programmable graphics processor includes the PLD instruction to configure Fragment Shader 155 within Programmable Graphics Processor 105 to detect a position conflict for a position and prevent a subsequent access of the position until the position conflict is resolved.

In step 915 Fragment Shader 155 receives a shader program instruction specifying a write to a first destination location. The first destination location may be within Registers 359 in Fragment Shader 155 or a location in graphics memory within a buffer. The first destination location may also include a buffer identifier. The buffer may include depth data, color data, stencil data, or the like. When optional Data Cache 352 is used, Data Cache 352 receives the destination location and invalidates any entry associated with the destination location. In one embodiment when processed shaded data is output to the destination location by Write Interface 357 Data Cache 352 receives and stores the processed shaded data in an entry associated with the destination location.

In step 919 Fragment Shader 155 receives a PLD instruction including a source location and a second destination location. In one embodiment the source location is the first destination location and the second destination location is Register 359. In another embodiment the source location is another location within the buffer. In yet another embodiment the source location is another location within another buffer.

In step 921 Pixel Load Unit 552 within Fragment Shader 155 determines if a write to the source location is pending, and, if so, Fragment Shader 155 remains in step 921, waiting until the write to the source location is complete, i.e. for the position conflict to be resolved. Execution of the PLD instruction eliminates the need for executing a flush instruction to drain Fragment Processing Pipeline 160 prior to reading the source location.

If in step 921 Pixel Load Unit 552 determines that a write to the source location is not pending, in step 923 Read Interface 353 outputs a read request for the source location to Memory Controller 120 and receives the data stored in the source location from Memory Controller 120. In an alternate embodiment Read Interface 353 reads the data stored in the source location from Data Cache 352. In step 925 Read Interface 353 outputs the data stored in the source location to Fragment Processing Unit 356 and Fragment Processing Unit 356 stores the data in the destination location, e.g. a location within Registers 359.

FIG. 9B illustrates an embodiment of a method of processing shader program instructions, including the steps described in relation to FIG. 9A. In step 915 Fragment Shader 155 receives a shader program instruction specifying a write to a first destination location. In step 917 Fragment Shader 155 receives additional shader program instructions. The additional program instructions may include write instructions specifying other destination locations. Steps 919, 921, 923 and 925 are completed as described in relation to FIG. 9A.

In an embodiment the source location specified in the PLD instruction is the first destination location specified in the shader program instruction received in step 915. Execution of the PLD instruction in the embodiment permits reading the source location during processing of the additional shader program instructions rather than draining the Fragment Shader 155 after the write to the first destination location and before executing the source read. Steps 915, 919, 921, 923, and 925 are completed as previously described.

FIG. 9C illustrates an embodiment of a method of processing shader program instructions, including the steps described in relation to FIG. 9A. Steps 915, 919, 921, 923, and 925 are completed as described in relation to FIG. 9A. In step 927 Fragment Shader 155 executes a non-dependent shader program instruction, i.e., an instruction that does not depend on data to be read from a source location for which a write is pending. In the method illustrated in FIG. 9C, Fragment Shader 155 does not process the other shader program until the PLD instruction has been executed.

Figure 9D:
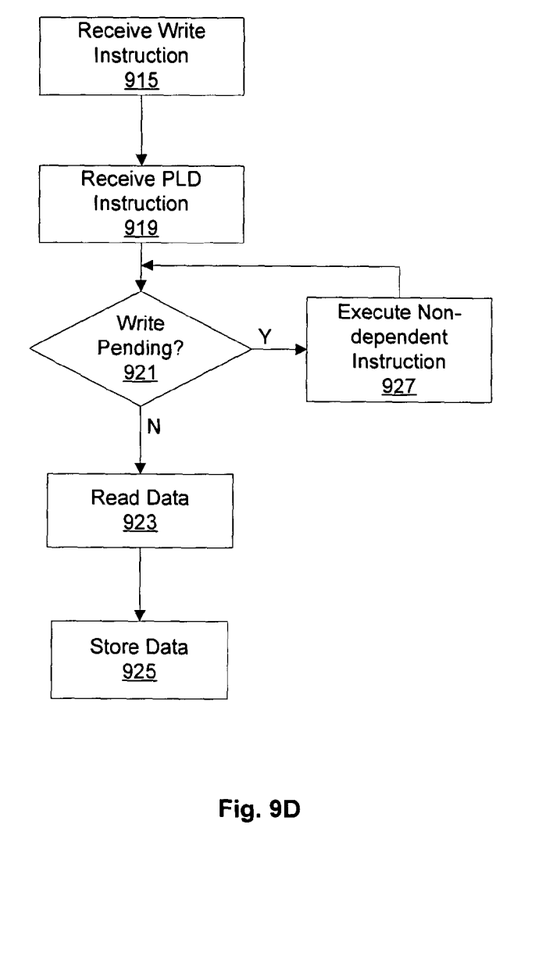

FIG. 9D illustrates a method of processing shader program instructions using an alternate embodiment of Fragment Shader 155 which permits execution of program instructions while waiting for a write to complete before executing a PLD instruction. Steps 915 and 919 are completed as described in relation to FIG. 9A. In step 921 Pixel Load Unit 552 within Fragment Shader 155 determines if a write to the source location is pending, and, if so, in step 927 Fragment Shader 155 executes another (subsequent) shader program instruction, permitting the subsequent shader program instruction to effectively bypass the PLD instruction. After executing the subsequent shader program instruction, Fragment Shader 155 returns to step 921.

In one embodiment of Fragment Shader 155, a subsequent program instruction is not executed in step 927 when the subsequent program instruction has a position conflict with the source location. In step 921 Pixel Load Unit 552 determines if a write to the source location is still pending, and, if not, Fragment Shader 155 completes steps 923 and 925 as previously described to complete execution of the PLD instruction.

Using a pixel load instruction and a pixel load enable instruction it is possible to directly read from a color buffer using the texture read interface without copying the color buffer to a texture buffer. The current invention involves systems and methods for processing graphics data using the pixel load instruction and pixel load enable instruction.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim. Within the claims, element lettering (e.g., "a)", "b)", "i)", "ii)", etc.) does not indicate any specific order for carrying out steps or other operations; the lettering is included to simplify referring to those elements.

The invention claimed is:

1. A method of executing a pixel load shader program instruction in a graphics processor, comprising:
   receiving a graphics fragment associated with a position;
   determining that the fragment is part of a new primitive;
   outputting a sync bundle;
   receiving confirmation that sync bundle processing is complete; and
   outputting the graphics fragment;
   wherein to avoid a read after write (RAW) conflict, only one sync bundle is output for each primitive.

2. The method of claim 1, further comprising shading the graphics fragment to produce a shaded fragment.

3. The method of claim 2, further comprising, prior to the outputting a sync bundle, determining pixel load is enabled for an output buffer associated with the graphics fragment.

4. The method of claim 1, further comprising:
   determining a pixel collision does not exist for the position; and
   determining a number of graphics fragments that have been output.

5. A method of executing a pixel load shader program instruction in a graphics processor comprising:
   receiving a graphics fragment associated with a position;
   outputting a sync bundle;
   receiving confirmation that the sync bundle processing is complete;
   outputting the graphics fragment;
   determining a pixel collision exists for the position; and
   outputting a second sync bundle.

6. The method of claim 5 wherein, on receipt of a sync bundle, the data in the output buffer is marked invalid.

7. A pixel load program instruction embodied in a computer readable-medium for reading pixel information from a writable buffer and storing the pixel information in a local storage element, the pixel load program instruction comprising:
   a source position corresponding to a location within the writable buffer;
   a destination address corresponding to the local storage element,
   wherein execution of the pixel load program instruction by a graphics processor comprises generating and processing of a sync bundle associated with a primitive comprising a plurality of fragments, and
   wherein the sync bundle is output when a pixel collision exists, the graphic processor being adapted to process a plurality of primitives without a sync bundle if no pixel collision exists.

8. The pixel load instruction of claim 7 wherein only one sync bundle is output for each of the primitives.

9. The pixel load instruction of claim 7 wherein the sync bundle includes a time stamp for differentiating the sync bundle from another sync bundle.

* * * * *